June 11, 1929.  J. JONAS  1,716,494

SYNCHRONOUS ROTATING FIELD COMMUTATOR MACHINE

Filed July 16, 1926  3 Sheets-Sheet 1

Witness:
R. Burkhardt

Inventor:
Julius Jonas,
By Cromwell, Smith & Larsen
Atty.

June 11, 1929.  J. JONAS  1,716,494
SYNCHRONOUS ROTATING FIELD COMMUTATOR MACHINE.
Filed July 16, 1926  3 Sheets-Sheet 2

Witness:
R. Burkhardt

Inventor:
Julius Jonas,
By Cronemer, ................ attys.

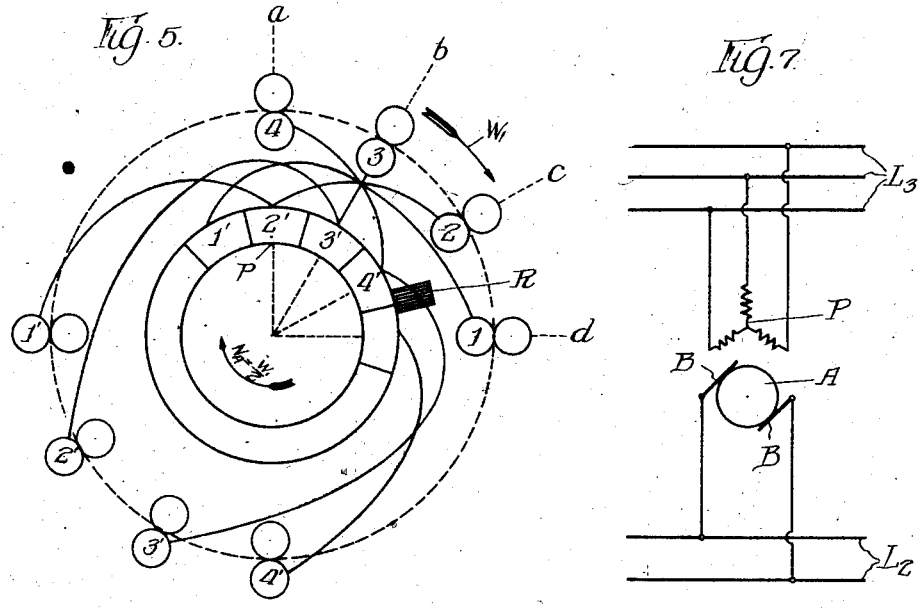
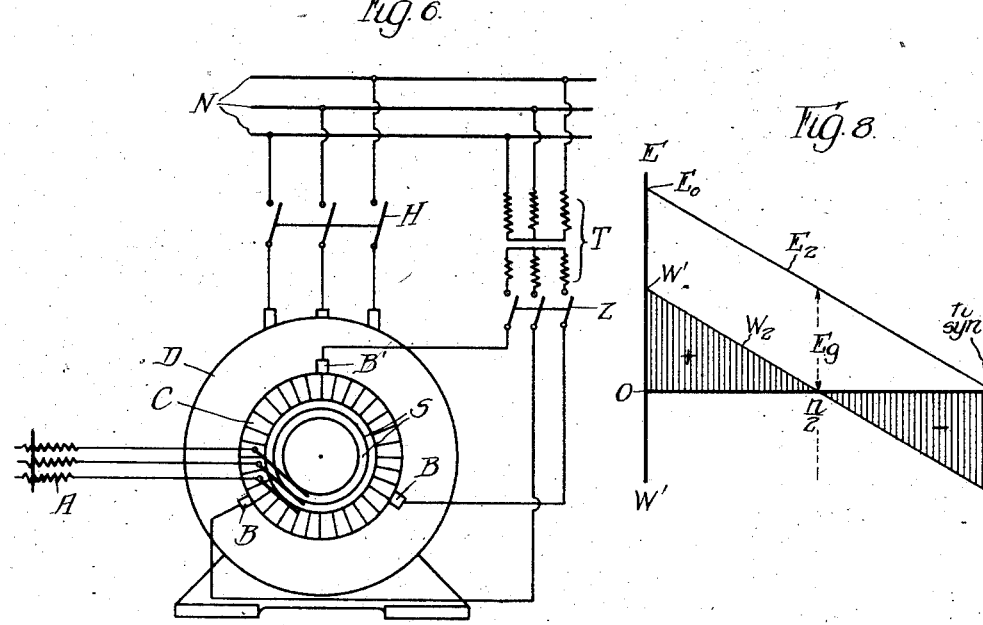

Patented June 11, 1929.

1,716,494

UNITED STATES PATENT OFFICE.

JULIUS JONAS, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

SYNCHRONOUS ROTATING-FIELD COMMUTATOR MACHINE.

Application filed July 16, 1926, Serial No. 122,750, and in Germany August 7, 1925.

This invention relates to the construction and operation of electrical machines of the synchronous rotating-field commutator type, and has to do principally with the operation of such machines for the conversion of electrical current and for the exciting, compensating and synchronizing of induction motors or the electrically linking of two systems operating with different frequencies and numbers of phases.

The general objects of the invention include the provision of a construction of such a machine and an arrangement of auxiliary apparatus whereby certainty of operation and effects will be obtained without the necessity for elaborate or complicated controlling adjuncts.

Another object is the provision of a construction for such a machine which will avoid destructive or wasteful commutating effects.

A further object is the provision of a construction which will permit certain simplifications in the mechanical construction.

Other and further objects will be pointed out or indicated hereinafter, or will be apparent to one skilled in the art upon an understanding of the invention.

For the purpose of illustration I displose herein certain applications of the invention, but it is to be understood that these are not regarded as exhaustive of the variations or forms of apparatus in which it may be embodied and utilized, or as imposing on the claims limitations not necessitated by the state of the art.

In the drawings forming a part of this specification,

Fig. 5 is a diagram illustrating commutating action in a machine in which the ratio of windings pitch to commutator segments pitch is $-1$;

Fig. 6 is a diagram representing the arrangement for connection of a machine containing the inverse armature winding and commutator segment connection illustrated in Figs. 4 and 5, to a three phase source of operating current.

Fig. 7 is a diagram illustrating connection of a machine for linking systems of different phases; and Fig. 8 is a diagram illustrating relationships of voltage and frequency variations in a machine embodying the invention.

Figure 3:
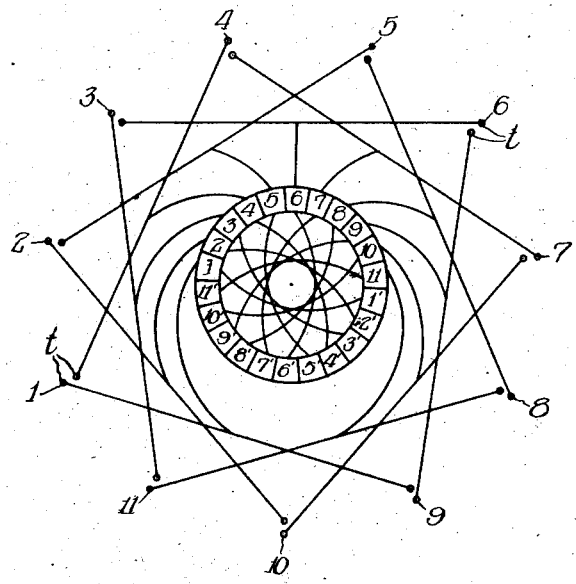
Fig. 3 is a diagram illustrating the connections between the armature windings and the commutator for a two pole machine of my improved design in which the ratio of the pitch angle between successive armature conductors to the pitch angle between successive commutator segments is 2;

In the usual forms of rotating-field commutator machines the pitch of successive armature conductors, in angular measure, is the same as that of their respective commutator segments. The present invention supplies a machine in which the ratio of the angular pitch of the armature conductors to the angular pitch of the corresponding commutator segments is a whole number value other than 1, said value being either positive or negative. For example, Fig. 3 illustrates the connections and relationship between armature windings and commutator segments for a two pole machine in which this ratio value is 2. The armature has eleven slots, each carrying two conductors $t$, connected in pairs, so that each pair of connected conductors represents one turn on the armature, the several windings being designated in the figure by the reference numerals 1 to 11 inclusive The commutator has twenty-two segments, the diametrically opposite segments being electrically connected. With the successive pairs of conductors connected to successive armature segments, it results that the pitch angle of the conductors is twice that of the corresponding segments, as the entire circumference of armature windings is accommodated by commutator segments comprising only one-half the circumference of the commutator. In such a case two brushes on the commutator at positions 180 electrical degrees apart would include an actual space angle of only 90°. The brush spacing, accordingly, must always be determined with reference to the pitch ratio, thus, Let $A_e$ be the electrical angle between the brushes, $A_s$ the space angle between the brushes, and $p$ the number of pairs of poles, and $K$ the ratio of windings pitch to commutator segments pitch; then $$\frac{A_e}{A_s} = K \times p.$$

Figure 4:
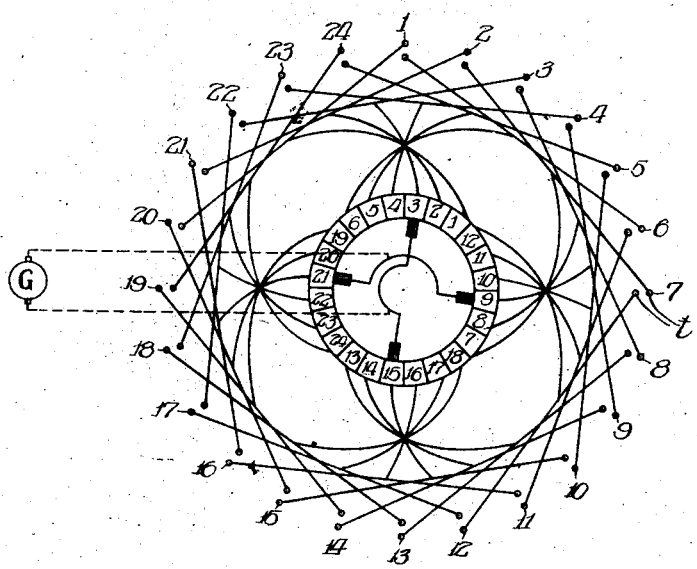
Fig. 4 is a diagram illustrating a connection of armature windings to commutator segments in which the pitch angle ratio is $-1$.

Fig. 4 represents diagrammatically an example of a four pole machine with the armature windings and commutator segments connected in inverse ratio ($K=-1$). The armature has twenty-four slots carrying a simple lap winding of twenty-four turns numbered 1 to 24 inclusive on the figure, and the commutator has twenty-four segments which, on this figure are numbered to correspond to the numbering of their connected windings. Winding number 1 is connected to segment number 1′, winding number 2, which is in the next adjacent slot in clockwise direction, is connected to segment number 2′, which is the next adjacent segment in counterclockwise direction, and so on, the connections thus progressing inversely at unit value until we come to the connection for winding number 7, which is connected to a segment diametrically opposite to the segment which is juxtaposed to segment number 6′ in the counterclockwise direction. However, in view of the fact that the opposite pairs of segments are always at the same potential, the same inverse connection is attained by the connection of the winding to the equipotential segment diametrically opposite the one next succeeding segment number 6′. This freedom enables the connectors between the turns and the segments to be much shorter than if the connections were made between windings and segments in actual succession. Thus, when $K=-1$ it is a simple matter to arrange the connections between armature windings and commutator segments so that they are divided into groups with the windings of each group connected respectively in inverse relationship to the segments of a corresponding group. The equipotential segments may be conductively connected either by respective conductors or through the instrumentality of brushes. With the grouping arrangement illustrated in Fig. 4, there are twenty-four winding turns and twenty-four commutator segments inversely connected in groupings of six. With this arrangement the number and spacing of the brush spindles will be the same as for an ordinary four pole machine. The construction accommodates various brush arrangements, however, as conversely to the possibility of reducing the number of brush spindles by the provision of equipotential connectors between segments, an increase in the pitch ratio value permits a similar increase in the number of brush spindles, and a consequent shortening of the commutator.

Figure 1:
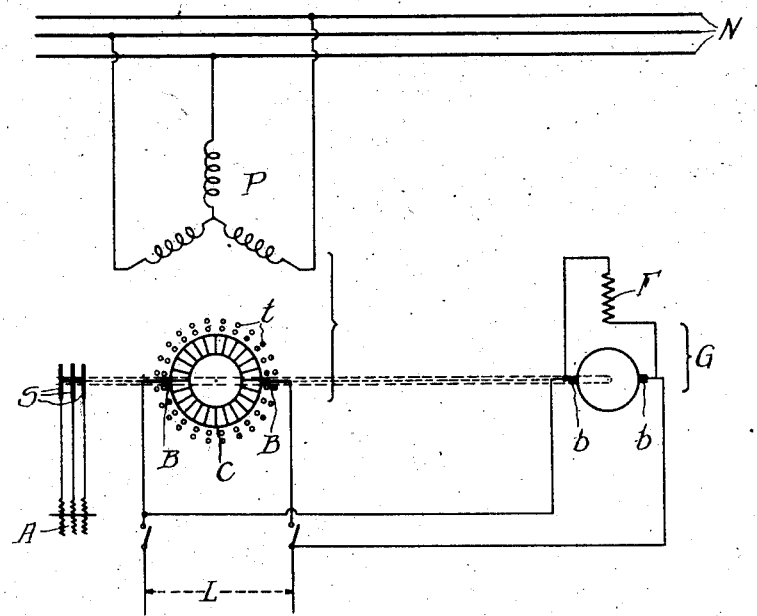
Fig. 1 is a diagram of an apparatus illustrative of the invention, and representing a commutator machine of my improved construction as connected with sources of direct and alternating currents for operation.

In Fig. 1 is illustrated diagrammatically an arrangement of apparatus for operation of a machine having the inverse connection of windings to segments as described above ($K=-1$). In this illustration the three-phase supply mains are designated N, the stator of the machine P and the commutator C. The stator windings are connected to the supply mains, and the armature windings $t$ are connected to the commutator segments in the inverse arrangement above described, there being an equal number of segments and windings. The rotor carries also the three slip rings S by means of which the starting resistances A may be cut into and out of the armature circuit incident to starting. The direct current machine G has its rotor carried on the same shaft as the rotor of the commutator machine, and has its field F connected in shunt across its brushes $b$. When it is desired to derive direct current from the commutator machine, it is first started up as an induction motor and brought up to about half synchronous speed. Then the brushes B of the commutator machine and the brushes $b$ of the DC machine are connected through the lines of the direct current system L. As a result, the DC machine impresses on the armature windings of the commutator machine a unidirectional E. M. F., whereupon the starting resistances A may be entirely cut out, since both sides of the commutator machine are under voltages of fixed frequencies and the machine, therefore, operating at synchronism. The R. P. M. at which the machine generates direct current are ascertainable from the general frequency equation as follows:

$$W_1 = KN_B + (K-1)N_A = W_2 \quad (1)$$

In this $W_1$ represents the frequency of the primary currents of the apparatus, $W_2$ represents the frequency of the secondary currents of the apparatus. $N_B$ represents frequency of the revolution of the commutator brushes (if these rotate), $N_A$ represents frequency of rotation of the armature, and $K$ represents the pitch ratio between armature windings and commutator segments. The ratio $K$ is always a whole number and can have any positive or negative value. If $K=0$, the machine has no commutator. By substituting definite values for the four unknowns in the frequency equation, the fifth may be ascertained, thus:
Making $W_2=0$ (viz, a DC machine),
$N_B=-0$ (viz, fixed brushes),
$K=-1$ (viz, inverse commutator connections), and
$W_1=$ the line frequency; we first obtain $$N_A = \frac{W_2 - W_1}{K - 1} \qquad (2),$$

and then $$N_A = \frac{W_1}{2}.$$

So, the R. P. M. at which the frequency equation is satisfied and the machine generates direct current is given by the value of $\frac{W_1}{2}$. Thus if a machine with inverse commutator connections, but having the pitch of the segments the same as that of the armature conductors, is driven at half synchronous speed in the same direction as the rotating field, then the potential difference across the commutator brushes will have zero frequency. The operation of this machine as a DC generator is thus bound up with the condition that the R. P. M. must be maintained at $\frac{N_{syn}}{2}$. If the speed of revolution is not maintained constant by synchronizing the driving mechanism, synchronization must be insured by impressing a unidirectional E. M. F. on the commutator from some external source, as above described. In this way, the machine is synchronized on the frequencies supplied to the stator and rotor. When so synchronized, the speed of revolution as given by the frequency equation cannot alter, for the reason that any difference between the supply and induced frequencies results in a relative displacement of the respective axes of the stator and rotor fields, which displacement is accompanied by large accelerating or retarding currents, owing to the action of which the machine is held in step with the supply frequency. The same effects occur, and the proper operating conditions may be determined in the same manner from the frequency equation previously given, when the value $K$ is positive but has values other than 1.

For example, substituting other values for $K$ in (2) with the brushes stationary ($N_B = 0$)

For $K=2$, $N_A = -W_1$

For $K=3$, $N_A = -\frac{W_1}{2}$ and so on.

In order to obtain satisfactory commutation, the flux must be suited to the commutation requirements and the maximum flux chosen so that it is not necessary to suppress the E. M. F.'s induced by the rotating field. A commutating E. M. F. can be obtained, however, by displacing the brushes somewhat "into the field". This is made possible by the fact that the short circuiting of the armature windings progresses, in effect, at the same velocity as the rotating field, although there is actually a relative motion between the winding and the field during commutation, due to the fact that the field rotates uniformly, whereas the short circuiting progresses by jumps as the successive segments pass under the brushes; together with the fact that the succeeding armature windings are always at the same point with regard to the rotating field at the instant of commutation, which position in relation to the rotating field is dependent on the position of the fixed brushes in space. The conditions are illustrated in Fig. 5 in which are shown armature turns numbered 1, 2, 3 and 4 with respective commutator segments numbered 1', 2', 3' and 4' connected to the windings in inverse connection $$\left(K = -1,\ N_A = \frac{W_1}{2}\right).$$

When a point P on the armature has rotated from position $a$ to position $b$ the stator field has moved from position $a$ to position $c$. With the brush R in the position shown, the winding 4—4 is short circuited when the point is at position $a$ and the coil 3—3 is short circuited when the point has reached position $b$, by which time winding 3—3 is already in position $c$. Thus owing to the inverse method of connection between the segments and the windings, the short circuiting of the windings progresses in effect at the same angular velocity as the stator field rotates, although the winding actually under short circuit is rotating at only half the speed at which the field rotates. By adjustment of the brushes in space, therefore, there may be effected a variation of the commutation with respect to the instant position of the rotating field, such as to obtain a commutating E. M. F. in the armature windings.

In the construction in which $K = -1$, that is to say, a machine with simple commutator in inverse connection, synchronous operation may be attained at the ordinary speed of synchronism, without the necesity for injecting direct curernt, it being sufficient that both stator and commutator are supplied with current at normal supply frequency. A suitable scheme of connections for such a machine is shown in Fig. 6, wherein D designates the rotary field commutator machine, having a commutator C inversely connected to the armature windings as above described. The machine has three brushes B on the commutator and three slip rings S for connecting in the variable resistance A at starting. The stator windings are connected to the three phase supply mains N through the switch H, and the armature windings are excited by current drawn from the supply mains through the auxiliary transformer T, to which the brushes are connected through the switch Z. The voltage requisite for the commutator is very low, since it has only to make up that lost through the ohmic resistance of the armature winding. The operation of synchronizing this machine is carried out in the same way as for an ordinary synchronous induction motor, that is, the machine is started up as an induction motor with resistances in the motor circuit, and the excitation voltage applied to the commutator when it gets up to about synchronous speed.

Machines in which $K$ has a value other than 1 may be employed also for AC to AC conversion, and the appropriate speed at which they must be driven will be found by substituting the proper value for $W_2$. Assuming that the brushes are fixed, then if $W_2 = W_1$, $$(K-1)N_A = 0.$$

This equation can be satisfied only if $N_A$ equals 0, or if $K=1$, which later is the ordinary rotating field commutator machine in which the frequency of the brush currents is the same as the supply frequency in the stator windings and is independent of the speed of rotation. The case is otherwise, however, if $W_2 = -W_1$, in which instance the frequency of rotation is represented $$N_A = -\frac{2W_1}{K-1}.$$

Substituting various values for $K$ gives the following:
When $$K = -2, \ N_A = \frac{2}{3}W_1,$$
$$K = -1, \ N_A = W_1$$
$$K = 2, \quad N_A = -2W_1$$
$$K = 3, \quad N_A = -W_1$$

The machine can also be employed to great advantage in another way, if E. M. F.'s of variable frequency are applied to the armature. We then make use of the following relation as given by the frequency equation:

$$N_A = \frac{W_2 - W_1}{K-1},$$

and when $$K = -1, \ N_A = \frac{W_1 - W_2}{2}.$$

Figure 2:
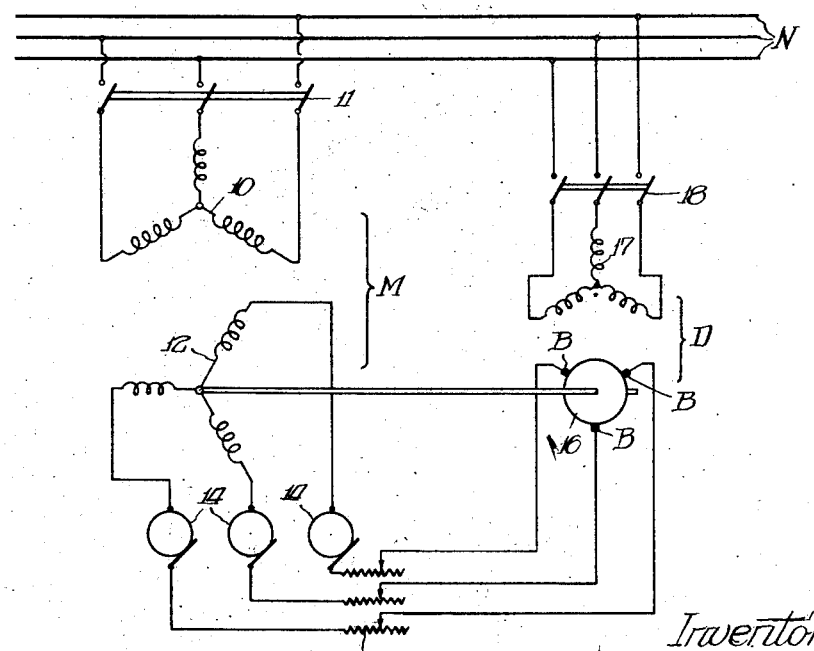
Fig. 2 is a diagram illustrating a machine of my improved construction arranged to function as an exciter for starting and compensating an induction motor, both being supplied from a three phase source of operating current.

If the value of $W_2$ varies between $W_1$, 0 and $-W_1$, then the frequency of revolution will vary between 0, $\frac{W_1}{2}$, and $-W_1$. Fig. 8 shows at $E_2$ the variation of the voltage at the commutator, and at $W_2$ the variation of the frequency, as functions of the speed of the machine. It will be seen that at a speed equal to half synchronous speed, the frequency $W_2$ is 0 and the voltage is $\frac{E_o}{2}$. With the machine normally working at this speed, the ratio of standstill voltage to working voltage is 2, and this is very favorable for the design and operation of the machine, from a purely electrical point of view. Another advantage of the new machine lies in the fact that the DC voltage may be chosen without reference to the voltage of the primary AC supply, since the unidirectional E. M. F. is derived by induction and not, as with the ordinary rotary converter, by conduction. Thus there is free choice of the pressure ratio. Consequently, the machine is very suitable as an exciter for starting and compensating induction motors. If the induction motor has $2_1$ poles, and the direct coupled rotary field commutator machine has $\frac{2_1}{1-K}$ poles, that is with only $p$ poles when $K = -1$, it will then supply direct current for excitation purposes exactly as synchronous speed is reached. In such case, when $K = -1$, the synchronous speed of the induction motor corresponds to half the synchronous speed of the commutator machine, at which speed, as shown above, direct current at half the standstill voltage is generated. Since the rotor frequency of the induction motor is zero at its synchronous speed, the frequency of the secondary currents of the two machines will be the same when synchronism is reached. Moreover, the two frequencies will be the same whatever the speed of the set. When at standstill, the secondary frequency of both machines is equal to the frequency of the primary mains, and at twice the synchronous speed of the induction motor the secondary frequencies of both machines are equal to the negative value of the primary frequency. For these reasons, the set may be started up without disconnecting the exciter, and it is not necessary to synchronize, as the exciter may be inserted before starting commences, and supplies current of the required frequency at all speeds. Such an arrangement is shown diagrammatically in Fig. 2, wherein $N$ designates the three phase supply mains to which the stator winding 10 of the induction motor M is connected through the switch 11. The motor winding 12 is connected through the slip rings 14 with the starting rheostat 15, the sliding contacts of which are connected to the brushes B of the commutator machine D. The rotor 16 of this machine is direct coupled with the rotor of the induction motor, and the stator 17 is connected to the mains through the switch 18. Assuming that the pitch ratio $K$ of the commutator machine equals $-1$, and that said machine has half as many poles as the induction motor, the frequency of the E. M. F.'s in both commutator and slip rings will be the same at all speeds.

A synchronous rotary field commutator machine constructed in accordance with the invention may be used for electrically linking two systems having different frequencies and numbers of phases. The stator winding of the machine is connected to one system, and the commutator, with a suitable number of brush sets, is connected to the other system. The speed at which the machine runs must then satisfy the general frequency equation $$N_A = \frac{W_2 - W_1}{1 - K}.$$

Fig. 7 shows such arrangement for a three phase system of frequency $W_1$ electrically linked with a single phase system of frequency $\frac{W_1}{3}$, in which case $N_A = \frac{W_1}{3}$.

The term "synchronous rotating-field commutator machine" refers to a particular type of machine, the principal features of which are a polyphase winding on the stator and an ordinary commutator winding on the rotor arranged with inverse connections as described. In operating such a machine, currents of definite frequency are supplied to both stator and commutator, the machine then running at a definite fixed speed.

The term "synchronous induction motor" refers to apparatus consisting of an induction motor with a direct-coupled D. C. exciter, and which is started up by cutting out resistance from the rotor circuit in the same manner as in operating an ordinary induction motor, and then pulling the motor into synchronism by introducing a direct current into the rotor by means of the exciter. The machine then runs with the characteristics of a synchronous motor.

What I claim is:

1. In a synchronous rotary-field commutator machine, the combination with the field and armature windings, of a commutator having segments electrically connected to the armature windings, the ratio of the angular pitch of the armature windings to the angular pitch of corresponding commutator segments being an integer value other than 1, and means for applying electrical currents to the field and armature windings.

2. In a synchronous rotary-field commutator machine, the combination with field and armature windings, of a commutator having segments electrically connected to respective armature conductors, the number of segments and their connections to said conductors being so arranged that the ratio of the angular pitch between successive armature conductors to the angular pitch between their connected segments is an integer value other than 1, and means for applying currents separately to the field and armature windings.

3. In a synchronous rotary-field commutator machine, the combination with armature conductors, of commutator segments electrically connected to said conductors in the relationship wherein the ratio $$\frac{\text{pitch of successive conductors}}{\text{pitch of corresponding segments}}$$

is an integer value other than 1, and means for short circuiting the conductors through the segments.

4. In a synchronous rotary-field commutator machine, the combination with the armature conductors, of commutator segments apportioned into groups, the segments of a group being connected to armature conductors in the relationship wherein the ratio $$\frac{\text{pitch of successive conductors}}{\text{pitch of corresponding segments}}$$

is an integer value other than 1, and means for short circuiting conductors in separate groups.

5. Apparatus of the class described, comprising the combination with a synchronous induction motor having armature windings, of a synchronous rotary-field commutator machine coupled to the motor and having armature windings and commutator segments so arranged and connected that the ratio $$\frac{\text{pitch of successive armature conductors}}{\text{pitch of corresponding segments}}$$

is an integer value other than 1, and means for electrically connecting the commutator segments to armature windings of the induction motor.

In testimony whereof I have hereunto subscribed my name at Zurich, Switzerland, on the 29 day June A. D. 1926.

JULIUS JONAS.

CERTIFICATE OF CORRECTION.

Patent No. 1,716,494. Granted June 11, 1929, to

JULIUS JONAS.

It is hereby certified that error appears in the printed specification of the above numbered patent requiring correction as follows: Page 1, line 28, for the misspelled word "displose" read "disclose"; page 4, lines 83 and 85, for "2 sub 1" read "2 sub p", and line 117, for "motor" read "rotor"; and that the said Letters Patent should be read with these corrections therein that the same may conform to the record of the case in the Patent Office.

Signed and sealed this 13th day of August, A. D. 1929.

(Seal)

M. J. Moore,
Acting Commissioner of Patents.